US009007972B2

(12) United States Patent
Gupta et al.

(10) Patent No.: US 9,007,972 B2
(45) Date of Patent: Apr. 14, 2015

(54) COMMUNICATION STATE TRANSITIONING CONTROL

(75) Inventors: Maruti Gupta, Portland, OR (US); Ali T. Koc, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 13/528,492

(22) Filed: Jun. 20, 2012

(65) Prior Publication Data

US 2013/0003577 A1    Jan. 3, 2013

Related U.S. Application Data

(60) Provisional application No. 61/542,086, filed on Sep. 30, 2011, provisional application No. 61/504,054, filed on Jul. 1, 2011.

(51) Int. Cl.
G08C 17/00    (2006.01)
H04W 76/04    (2009.01)
H04W 52/02    (2009.01)

(52) U.S. Cl.
CPC ........ *H04W 76/048* (2013.01); *H04W 52/0225* (2013.01); *H04W 76/046* (2013.01); *H04W 52/0212* (2013.01)

(58) Field of Classification Search
CPC ....... H04L 47/11; H04L 47/14; H04L 47/283; H04L 47/30; H04L 5/001; H04L 5/003; H04L 5/0032; H04L 5/0053; H04L 5/0064; H04L 5/0094; H04L 1/1861; H04L 47/12; H04L 67/104; H04L 67/1061; H04W 28/12; H04W 36/22

USPC ......... 370/331, 329, 312, 254, 252, 230, 315, 370/328; 709/231, 244, 227, 203
See application file for complete search history.

(56) References Cited

U.S. PATENT DOCUMENTS

| | | | |
|---|---|---|---|
| 2003/0167343 A1* | 9/2003 | Furuno | 709/244 |
| 2009/0129339 A1 | 5/2009 | Young et al. | |
| 2009/0180414 A1 | 7/2009 | Maeda et al. | |
| 2010/0034145 A1 | 2/2010 | Kim et al. | |
| 2010/0118752 A1 | 5/2010 | Suzuki et al. | |
| 2011/0159895 A1 | 6/2011 | Arzelier et al. | |

(Continued)

FOREIGN PATENT DOCUMENTS

WO    WO2011/060998 A1    5/2011

OTHER PUBLICATIONS

Lindstrom et al., "LTE-Advanced Radio Layer 2 and RRC aspects," 3GPP TSG-RAN WG2, Rev-090004, 3GPP LTE-Advanced Evaluation Workshop, Dec. 17-18, 2009, pp. 1-38.

(Continued)

*Primary Examiner* — Christopher Grey
*Assistant Examiner* — Oussama Roudani
(74) *Attorney, Agent, or Firm* — Schwabe, Williamson & Wyatt, P.C.

(57) ABSTRACT

Embodiments of the present disclosure describe devices, methods, computer-readable media and systems configurations for managing state transitions of communication circuitries in wireless networks. Embodiments manage radio resource control (RRC) state transitions and/or discontinuous reception (DRX) state transitions. Other embodiments may be described and/or claimed.

18 Claims, 8 Drawing Sheets

(56) References Cited

U.S. PATENT DOCUMENTS

2012/0275366 A1* 11/2012 Anderson et al. ............. 370/311
2013/0223370 A1* 8/2013 Larmo et al. ................. 370/329

OTHER PUBLICATIONS

International Search Report and Written Opinion mailed Jan. 17, 2013 from International Application No. PCT/US2012/044449.
Office Action mailed Nov. 13, 2014 for Australian Patent Application No. 2012279365, 2 pages.
Extended European Search Report mailed Dec. 11, 2014 for European Patent Application No. 12707727.8, 8 pages.
Office Action mailed Dec. 22, 2014 for Australian Patent Application No. 2012279365, 8 pages.
Intel Corporation, "LTE Fast Dromancy," 3GPP TSG-RAN WG2 Meeting #72, Jacksonville, FL, USA, Nov. 15-19, 2010, 7 pages.
Research in Motion UK Limited, "Way Forward for LTE RAN Enhancements for Diverse Data Applications," 3GPP TSG-RAN WG2, Shanghai, China, Apr. 11-15, 2011, 4 pages.

* cited by examiner

US 9,007,972 B2

COMMUNICATION STATE TRANSITIONING CONTROL

CROSS REFERENCE TO RELATED APPLICATIONS

The present application claims priority to U.S. Provisional Patent Application No. 61/504,054, filed Jul. 1, 2011, entitled "METHOD AND APPARATUS FOR LTE" and U.S. Provisional Patent Application No. 61/542,086, filed Sep. 30, 2011 entitled "ADVANCED WIRELESS COMMUNICATION SYSTEMS AND TECHNIQUES," the entire disclosures of which are hereby incorporated by reference.

FIELD

Embodiments of the present invention relate generally to the field of communications, and more particularly, to controlling communication-state transitions within user equipment used in wireless communication networks.

BACKGROUND

User equipment (UE) used within wireless communication networks may include a number of various communication states that may be employed to save power and/or network resources. For example, $3^{rd}$ Generation Partnership Project (3GPP) long-term evolution (LTE) Release 10 (March 2011), which may also be referred to as LTE-Advanced (LTE-A), provides two states for radio resource control (RRC) circuitry, i.e., RRC_idle and RRC_connected. In general, a UE may be instructed by a base station to release its connection, e.g., transition from RRC_connected to RRC_idle, in the event no communications occur for a predetermined period of time. The predetermined period of time may be set by an idle inactivity timer. When communications are to be commenced, the UE may reacquire its connection, e.g., transition from RRC_idle to RRC_connected, in order to commence with the communication.

Currently, several different types of Internet applications running on UEs send short messages that cause frequent state transitions by the UE. This may result in a large signaling overhead, both over the air as well as the core network, due to authentication, key exchange, IP address assignments, etc., that may be required for the UE to reacquire its connection.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for managing communication-state transitions within wireless networks.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

Unless the context dictates otherwise, the phrases "A or B," "A/B," and "A and/or B" mean (A), (B), or (A and B).

As used herein, the term "circuitry" may refer to, be part of, or include an Application Specific Integrated Circuit (ASIC), a processor (shared, dedicated, or group) and/or memory (shared, dedicated, or group), combinational logic circuit, or other electronic circuit that provides the described functionality. In various embodiments, the circuitry may execute instructions stored in one or more computer-readable media to provide the described functionality.

Figure 1:
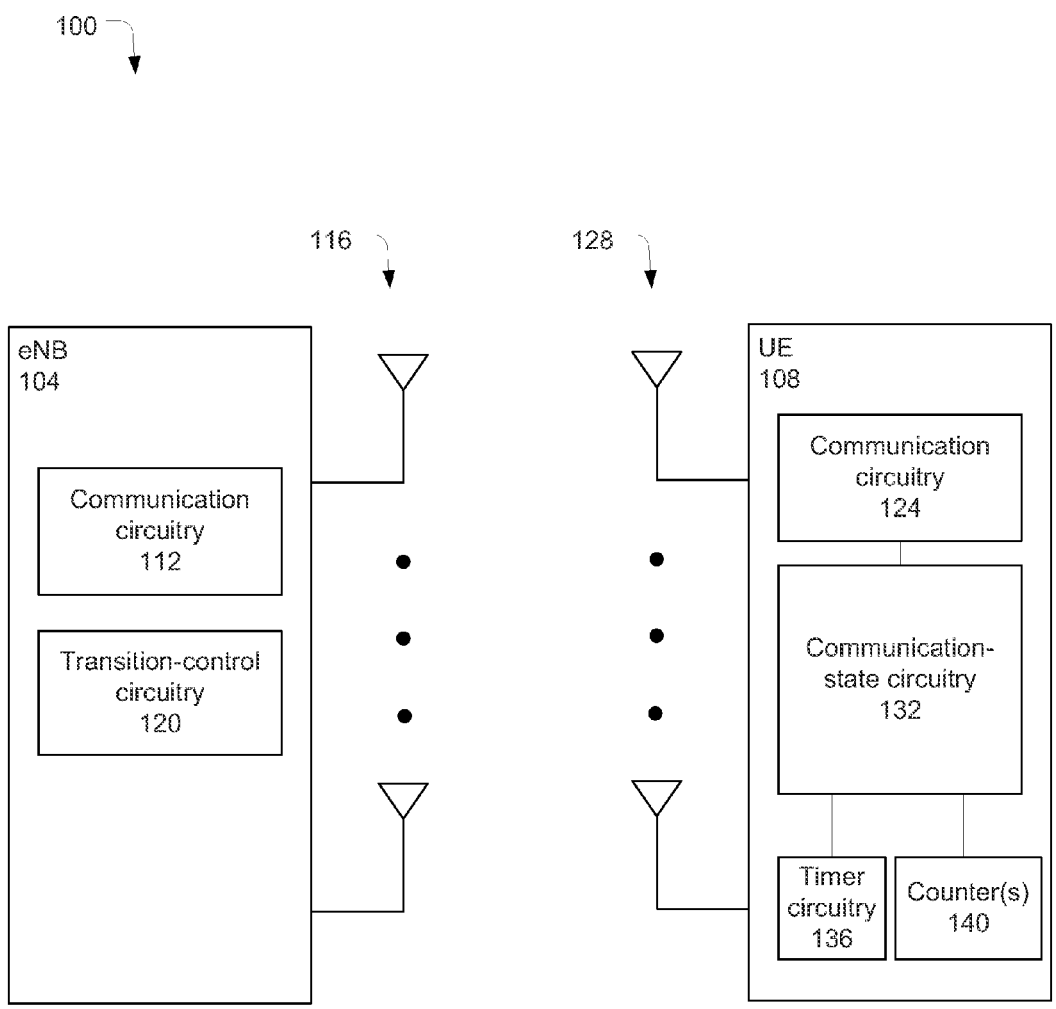
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution advanced (LTE-A) network such as an evolved universal terrestrial radio access network (EUTRAN). The network 100 may include a base station, e.g., enhanced node base station (eNB) 104, configured to wirelessly communicate with a mobile device, e.g., user equipment (UE) 108. While embodiments of the present invention are described with reference to an LTE-A network, embodiments may be used with other LTE releases as well as other types of wireless access networks.

The eNB 104 may include communication circuitry 112 coupled with one or more antennas 116 to facilitate over-the-air (OTA) communication with other nodes on the network 100, for example, UE 108. The eNB 104 may further include transition-control circuitry 120 coupled with the communication circuitry 112. The transition-control circuitry 120 may control various states of communication circuitry of the nodes in the network 100, e.g., UE 108.

The UE 108 may include communication circuitry 124 coupled with one or more antennas 128 to facilitate OTA communication with other nodes of the network 100, for example, eNB 104. The UE 108 may further include communication-state circuitry 132 that controls the states of communication circuitry 124. Communication-state circuitry 132 may control the states of communication circuitry 124 by cooperating with transition-control circuitry 120. The UE 108 may further include timer circuitry 136 and one or more counter(s) 140 that may be controlled by the communication-state circuitry 132 to monitor state transitions within various tracking windows as will be described below. The timer circuitry 136 may include one or more timers such as, but not limited to, a discontinuous reception (DRX) inactivity timer, an RRC-inactivity timer, a DRX tracking timer, an RRC tracking timer, a high-value timer, etc. The counter(s) 140 may include one or more counters such as, but not limited to, a DRX counter, an RRC counter, etc.

Some of the state transitions of the communication circuitry 124 contemplated herein include RRC-state transitions, e.g., between RRC_idle and RRC_connected, and DRX-state transitions. DRX-state transitions may include transitions into or out of a DRX mode, e.g., DRX-inactive mode and DRX-active mode, and transitions between different DRX configurations.

In some embodiments, a state transition may occur by the communication-state circuitry 132 of the UE 108 sending a message to the transition-control circuitry 120 of the eNB 104 to request the transition. In response, the transition-control circuitry 120 may return a control message that instructs the transition. In some embodiments, the UE 108 may have further autonomy with respect to certain state transitions, e.g., transitions between DRX configurations. An autonomous state change, as used herein, means that the UE 108 will perform the state change without being instructed to do so by the eNB 104.

Figure 2:
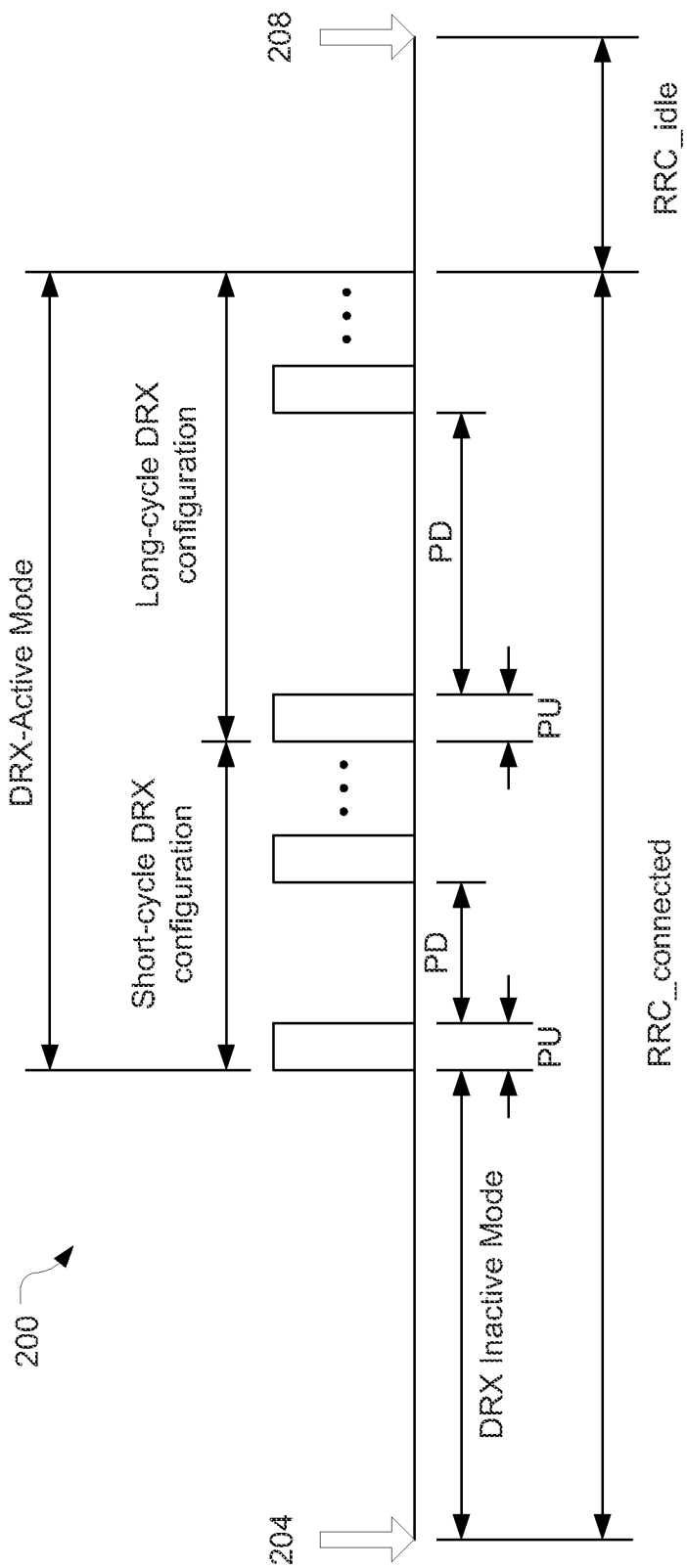
FIG. 2 illustrates a timing sequence related to state transitions in accordance with various embodiments.

FIG. 2 illustrates a timing sequence 200 to further explain these state transitions in accordance with some embodiments.

At 204, a packet may be served by the communication circuitry 124. The packet may be either transmitted from, or received by the communication circuitry 124. Upon serving the packet, both the RRC-inactivity timer and the DRX-inactivity timer of the timer circuitry 136 may be started. The inactivity timers are initially set to a value that corresponds to an inactivity period. Typically, the RRC-inactivity period may be longer than the DRX-inactivity period due to the relatively greater delay associated with an RRC transition as opposed to a DRX transition.

If no packets are received during the DRX-inactivity period, indicated upon expiration of the DRX-inactivity timer, the communication circuitry 124 may perform a DRX-state transition by transitioning into a DRX-active mode having a first cycle length, e.g., a short-cycle DRX.

In the short-cycle DRX, some or all of the components of the communication circuitry 124 may be periodically powered down (PD in FIG. 2), e.g., turned off, and then powered up (PU in FIG. 2), e.g., turned on. While the components are powered down, packets that are to be served may be buffered, either at the eNB 104 or the UE 108, until the components are powered back up. During the powered down periods the connection with the eNB 104 may remain activated with the resources being continuously allocated to the UE 108.

After a predetermined number of on/off cycles of a short-cycle DRX without serving additional packets, the communication circuitry 124 may switch to a second cycle length, e.g., a long-cycle DRX. The long-cycle DRX may be similar to the short-cycle DRX except that it may include a longer powered-down period and, therefore, conserve more power. The various parameters of DRX operation, e.g., length of PD/PU, number of on/off cycles between switching cycle lengths, etc., may be defined by a DRX configuration. In some embodiments, a state transition may involve changing DRX configurations to update/change one or more of these parameters. As with other state transitions, this may involve, in some embodiments, various messaging between the communication-state circuitry 132 and transition-control circuitry 120.

If no packets are received during an idle period, indicated upon expiration of the RRC-inactivity timer, the communication circuitry 124 may perform a state transition by releasing its connection and transitioning from an RRC_connected state to an RRC_idle state. The communication circuitry 124 may be in RRC_idle state until, at 208, another packet needs to be served. At this point, the communication circuitry 124 may perform another state transition, from RRC_idle to RRC_connected, which may involve authentication, key exchange, IP address assignment, etc. so that the UE 108 may reacquire its connection.

Figure 3:
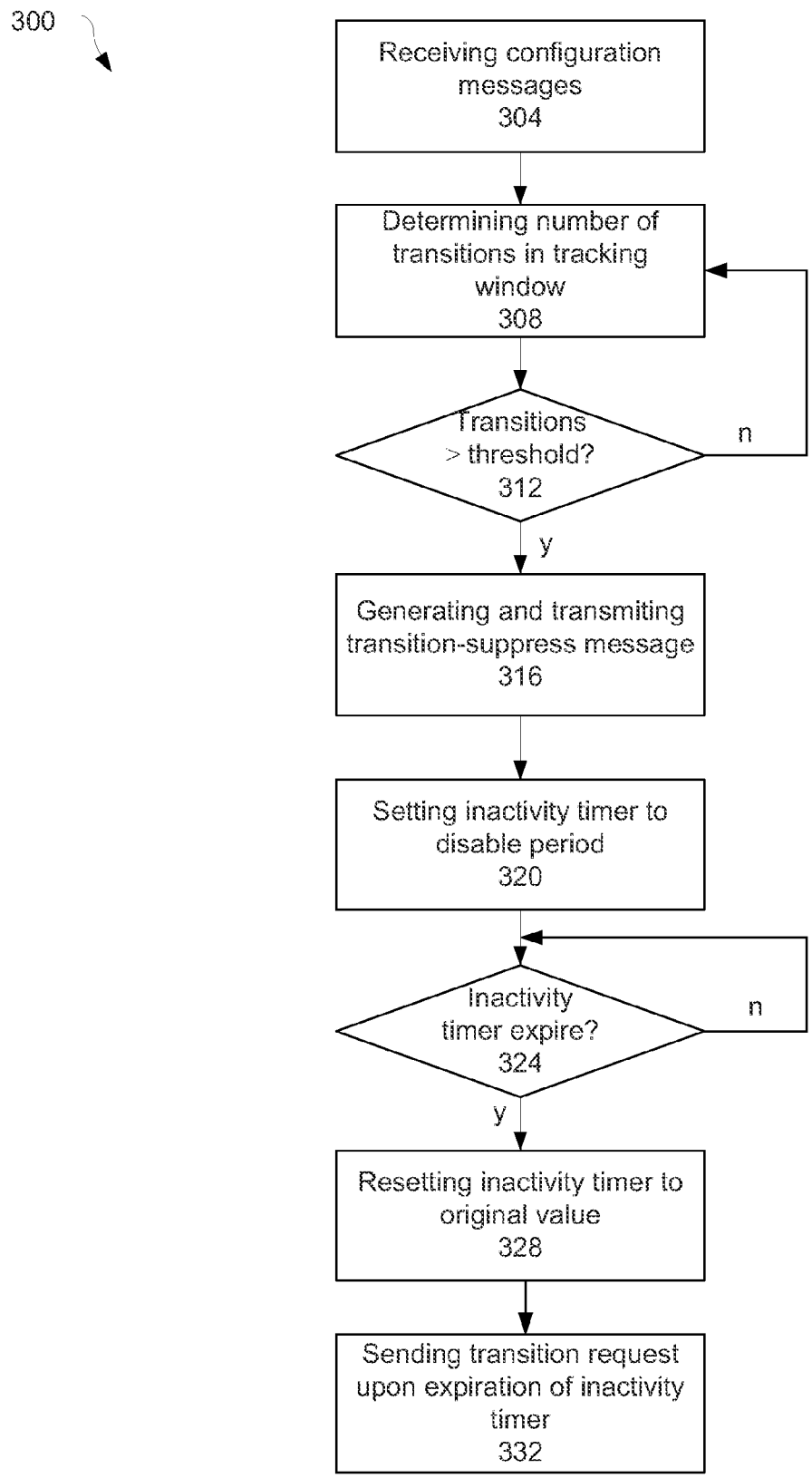
FIG. 3 illustrates a flowchart depicting an operation of communication-state circuitry in a user equipment in accordance with various embodiments.

FIG. 3 illustrates a flowchart depicting an operation 300 of the communication-state circuitry 132 in accordance with some embodiments.

The operation 300 may include, at block 304, receiving configuration messages. The configuration messages may be RRC and/or medium access control (MAC) messages received from the eNB 104 that include the configuration parameters. In some embodiments the configuration parameters may be received in an RRC configuration process of the UE 108.

In various embodiments, the configuration parameters may be used to establish, e.g., the RRC-inactivity period, the DRX-inactivity period, an RRC tracking window, a DRX tracking window, one or more state-transition disable periods, and one or more counter thresholds (e.g., RRC-state transition threshold, DRX-state transition threshold, etc.). In other embodiments, the UE 108 may be preprogrammed with one or more of these parameters or receive one or more of these parameters in separate control signaling.

It may be noted that a counter threshold may be a configurable number that is based on an inactivity period and tracking window. For example, if the inactivity period is 10 seconds and the tracking window is 60 seconds, only 6 transitions may possibly occur in the tracking window. Thus, the counter threshold may be set at a number less than 6. In some embodiments, the tracking window and/or inactivity period may be dynamic. In these embodiments, the associated counter threshold may be similarly dynamic. In some embodiments, the counter threshold may be dynamically determined by the UE 108 based on present tracking window and/or inactivity period, or may be dynamically determined by the eNB 104 with updates being sent to the UE 108.

The operation 300 may include, at block 308, determining a number of transitions in a tracking window. In some embodiments, the communication-state circuitry 132 may set a tracking timer of the timer circuitry 136 to a value indicated by the configuration parameters and a counter of the communication-state circuitry 132 may be initialized to zero. Upon receipt of a state-transition indication, the tracking timer of the timer circuitry 136 may begin to count down and the counter may be controlled to increment for every tracked state transition that occurs while the tracking timer is not zero. The tracked-state transitions may be RRC transitions, DRX transitions, or some combination thereof.

The operation 300 may include, at block 312, comparing tracked transitions to predetermined threshold. For example, the comparing may include determining whether the tracked transitions are greater than or equal to the relevant threshold for the relevant tracking window.

If, at block 312, it is determined that the number of tracked transitions are less than the relevant threshold for the tracking window, the operation 300 may loop back to block 308. In some embodiments, the tracking window may be a sliding window with the determining of block 308 done at a predefined interval, e.g., every 2 seconds. For example, if the tracking window is 60 seconds, the number of state transitions that have occurred in the previous 60 seconds may be determined every 2 seconds.

If, at block 312, it is determined that the number of tracked transitions are greater than the relevant threshold for the tracking window, the operation 300 may advance to block 316. In other embodiments, other comparisons of the tracked transitions to the predetermined threshold may be used.

At block 316, the operation 300 may include generating and transmitting a transition-suppress message. The transition-suppress message may be a message transmitted to the transition-control circuitry 120 that requests the eNB 104 to refrain from instructing the communication-state circuitry 132 to conduct a relevant state transition for a given period of time, e.g., the relevant state-transition disable period. In some embodiments, the state-transition disable period will be known at the eNB 104 and therefore it may be unnecessary to include it in the transition-suppress message. In other embodiments, the communication-state circuitry 132 may select a particular state-transition disable period and may send the selected state-transition disable period along with the transition-suppress message. The transition-control circuitry 120 may consider the selected state-transition disable period transmitted with the transition-suppress message as a suggested period to refrain from transmitting a subsequent transition-control message.

In some embodiments, the generating and transmitting of the transition-suppress message at block 316 may not be necessary. For example, both the UE 108 and eNB 104 may have sufficient information as to operation in the event of the tracked transitions exceeding the threshold through appropriate RRC configuration (e.g., at block 304).

The operation 300 may include, at block 320, setting a relevant inactivity timer to the state-transition disable period. The inactivity timer may then be started. This may result in the delay of any transition requests for a time period at least equal to the state-transition disable period.

In embodiments in which the tracked transitions are RRC transitions and the inactivity timer is an RRC-inactivity timer, the operation 300 may further include, at block 320, initiating a DRX mode. In this instance, the DRX mode may be initiated, whether or not the DRX inactivity timer has expired, in an effort to conserve power in light of the suppressing of the transition to the RRC_idle state. Initiating the DRX mode may be done by the communication-state circuitry 132 sending a transition request to the transition-control circuitry 120 and subsequently receiving a transition control message to instruct the initiation of the DRX mode.

At block 324, the operation 300 may include determining whether the relevant inactivity timer expires without serving of a packet or other event that would reset the inactivity timer. If the inactivity timer has not expired, the operation 300 may loop back to block 324.

When the inactivity timer is determined to be expired, at block 324, the operation 300 may include resetting inactivity timer to original value, e.g., the inactivity period. If the inactivity timer subsequently expires without the communication circuitry 124 serving a packet a transition request may be sent, at block 332, by the communication-state circuitry 132 to the transition-control circuitry 120 as a request for the transition-control circuitry 120 to control/instruct a state transition of the communication circuitry 124. As mentioned above, in some embodiments, the UE 108 may include greater degrees of autonomy in transitioning between states. In some of these embodiments, the sending of the transition request of block 332 may be replaced with a sending of a transition notice to notify the transition-control circuitry 120 of the autonomous state change.

While the above described embodiment includes setting the inactivity timer to a state-transition disable period value (at block 320) and, upon expiration, resetting the inactivity timer to original value (at block 328), other embodiments may delay transition requests in other manners. For example, in some embodiments, the method may include adding a state-transition disable period value to a particular instance of the inactivity timer.

An example of the operation 300 in which the tracked transitions are RRC state transitions may now be briefly explained. At block 304, the operation 300 may include receiving configuration parameters that include values that correspond to the RRC tracking timer, RRC counter threshold value, and/or RRC state-transition disable period. The operation 300 may then advance to tracking RRC state transitions at block 308.

If it is determined that the number of RRC state transitions within a given RRC tracking window is greater than or equal to the RRC counter threshold, at block 312, the communication-state circuitry 132 may, at block 316, generate and transmit a message, e.g., an idle-suppress message, to the transition-control circuitry 120 that requests suppression of control messages that would instruct the communication-state circuitry 132 to transition to RRC_idle. At block 320, the RRC-inactivity timer may be set to an RRC state transition disable period value. In this instance, the communication-state circuitry 132 may extend the time the communication circuitry 124 is to remain in the RRC_connected state to avoid overconsumption of resources due to frequent RRC state transitions.

The RRC-inactivity timer may expire when no packet has been served for at least the RRC-inactivity period and RRC transitions have not exceeded the counter threshold for an RRC tracking window for at least the state-transition disable period. Upon expiration of the RRC-inactivity timer, at block 324, the communication-state circuitry 132 may reset the inactivity timer to its original value. Once the RRC-inactivity timer subsequently expires, the communication-state circuitry 132 may send a transition request, at block 332, to the transition-control circuitry 120 to request transition instructions.

An example of the operation 300 in which the tracked transitions are DRX state transitions may now be briefly explained. At block 304, the operation 300 may include receiving configuration parameters that include values that correspond to the DRX tracking timer, DRX counter threshold value, and/or DRX state-transition disable period. The operation 300 may then advance to tracking DRX state transitions at block 308. The tracked DRX state transitions may be transitions into or out of the DRX-active mode or they may be transitions between DRX configurations. If it is determined that the number of DRX state transitions within a given DRX tracking window is greater than or equal to the DRX counter threshold, at block 312, the communication-state circuitry 132 may, at block 316, generate and transmit a message to the transition-control circuitry 120 that requests suppression of control messages that would instruct the communication-state circuitry 132 to transition between DRX states. At block 320, the DRX-inactivity timer may be set to the DRX state-transition disable period. In this instance, the communication-state circuitry 132 may decrease the frequency of the DRX state transitions to avoid overconsumption of resources. Upon expiration of the DRX-inactivity timer, at block 324, the communication-state circuitry 132 may reset the DRX-inactivity timer to its original value. Upon subsequent expiration of the DRX-inactivity timer, the communication-state circuitry 132 may send a transition request, at block 332, to the transition-control circuitry 120 to request transition instructions.

Various other embodiments may include other types of tracked transitions. For example, in some embodiments, the tracked transitions may be autonomous state changes. This may be used to limit the frequency at which the UE 108 performs state transitions without being instructed to do so by the transition-control circuitry 120.

Figure 4:
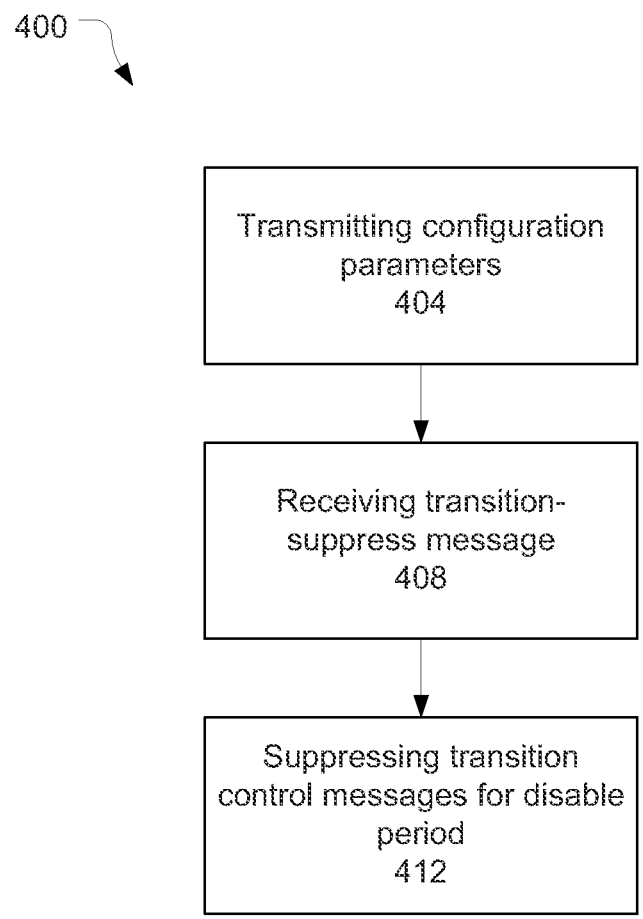
FIG. 4 illustrates a flowchart depicting an operation of transition-control circuitry in a base station in accordance with various embodiments.

FIG. 4 illustrates a flowchart depicting an operation 400 of the transition-control circuitry 120 in accordance with some embodiments.

The operation 400 may include, at block 404, transmitting configuration parameters. The configuration parameters may be transmitted from the transition-control circuitry 120 the communication-state circuitry 132 and may be used to establish, e.g., the RRC-inactivity period, the DRX-inactivity period, an RRC tracking window, a DRX tracking window, one or more state-transition disable periods, and one or more counter thresholds (e.g., RRC-state transition threshold, DRX-state transition threshold, etc.).

At block 408, the operation 400 may include receiving a transition-suppress message. The transition-suppress message may be received by the transition-control circuitry 120 from the communication-state circuitry 132. The transition-suppress message may include a request to suppress transition control messages for a period of time.

At block 412, the operation 400 may include suppressing transition control messages for a state-transition disable period. In some embodiments, the transition-control circuitry 120 may determine the state-transition disable period based on information received in the transition-suppress message and/or information previously stored at the eNB 104.

Figure 5:
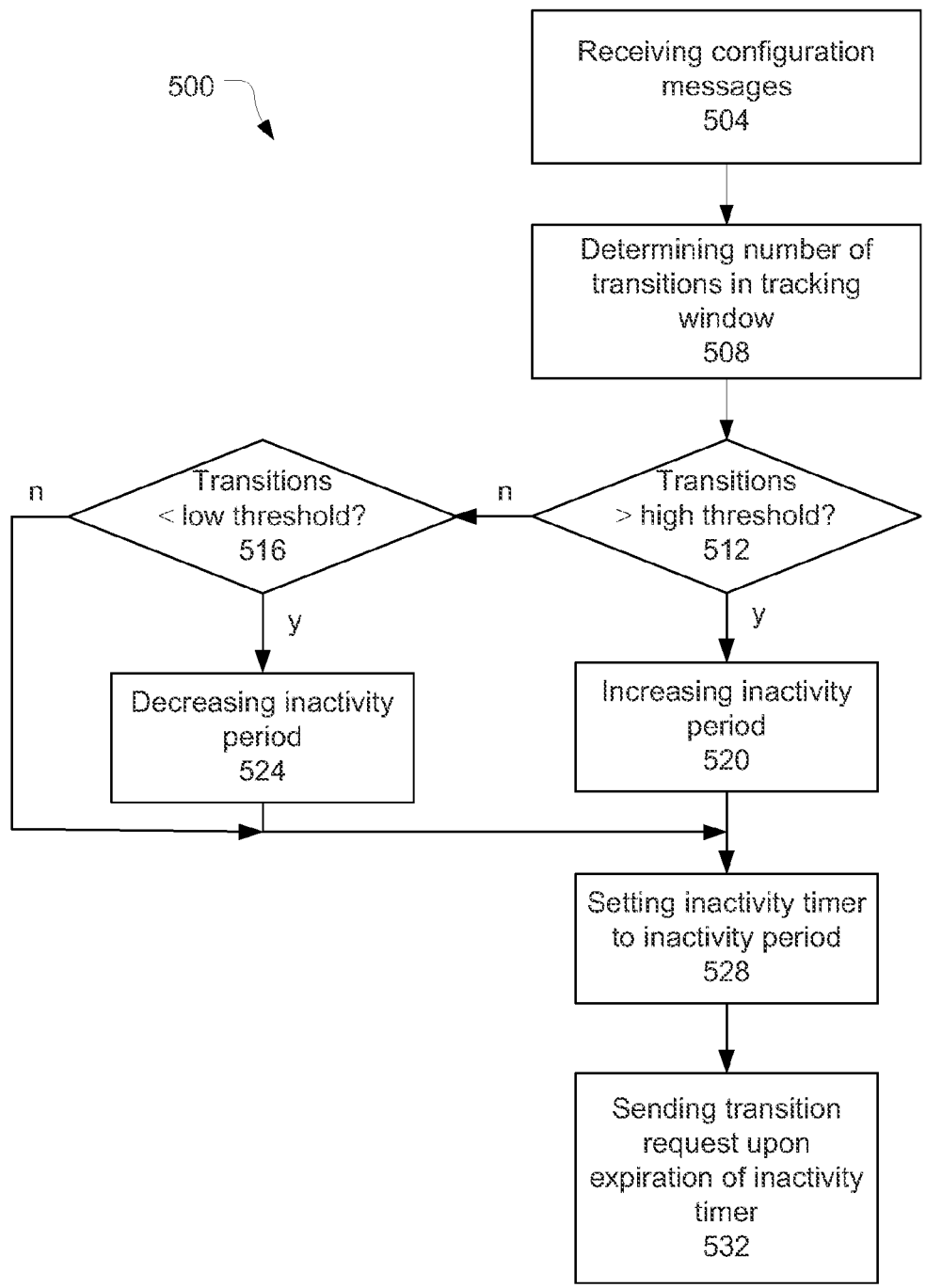
FIG. 5 illustrates a flow chart depicting an operation of communication-state circuitry in a user equipment in accordance with various embodiments.

FIG. 5 illustrates a flowchart depicting an operation 500 of the communication-state circuitry 132 in accordance with some embodiments.

The operation 500 may include receiving configuration messages at block 504 and determining number of transitions in tracking window at 508 similar to like-named blocks of operation 300.

At blocks 512 and 516, the operation 500 may include comparing the number of tracked transitions to high and low thresholds. In particular, at block 512, the operation 500 may include determining whether tracked transitions are greater than a high threshold. If an affirmative determination is obtained at block 512, the operation 500 may advance to increasing an inactivity period value at block 520. The amount in which the inactivity period is increased may be a delta value or it may be one or more increments within a table of inactivity period values. The high/low threshold, delta value and/or table of inactivity period values may be provided to the UE 108 in the configuration messages of block 504. In this manner, the communication-state circuitry may suppress state transitions by decreasing the rate at which the communication-state circuitry 132 will switch states.

If a negative determination is obtained at block 512, the operation 500 may advance to block 516. At block 516, the operation 500 may include determining whether tracked transitions are less than a low threshold. If an affirmative determination is obtained at block 516, the operation 500 may advance to decreasing an inactivity period at block 524. The amount in which the inactivity period is decreased may be a delta value or it may be one or more decrements within a table of inactivity period values. The delta value and/or table of inactivity period values may be provided to the UE 108 in the configuration messages of block 504. In this manner, rate at which the communication-state circuitry 132 will switch states will be increased, which may result in an increase in power savings.

Following block 520, 524, or a negative determination at block 516, the operation 500 may include setting an inactivity timer to the inactivity period at block 528.

In the event the inactivity timer expires without the communication circuitry 124 serving a packet, the operation 500 may include sending a transition request at block 532, similar to block 332 of operation 300.

Figure 6:
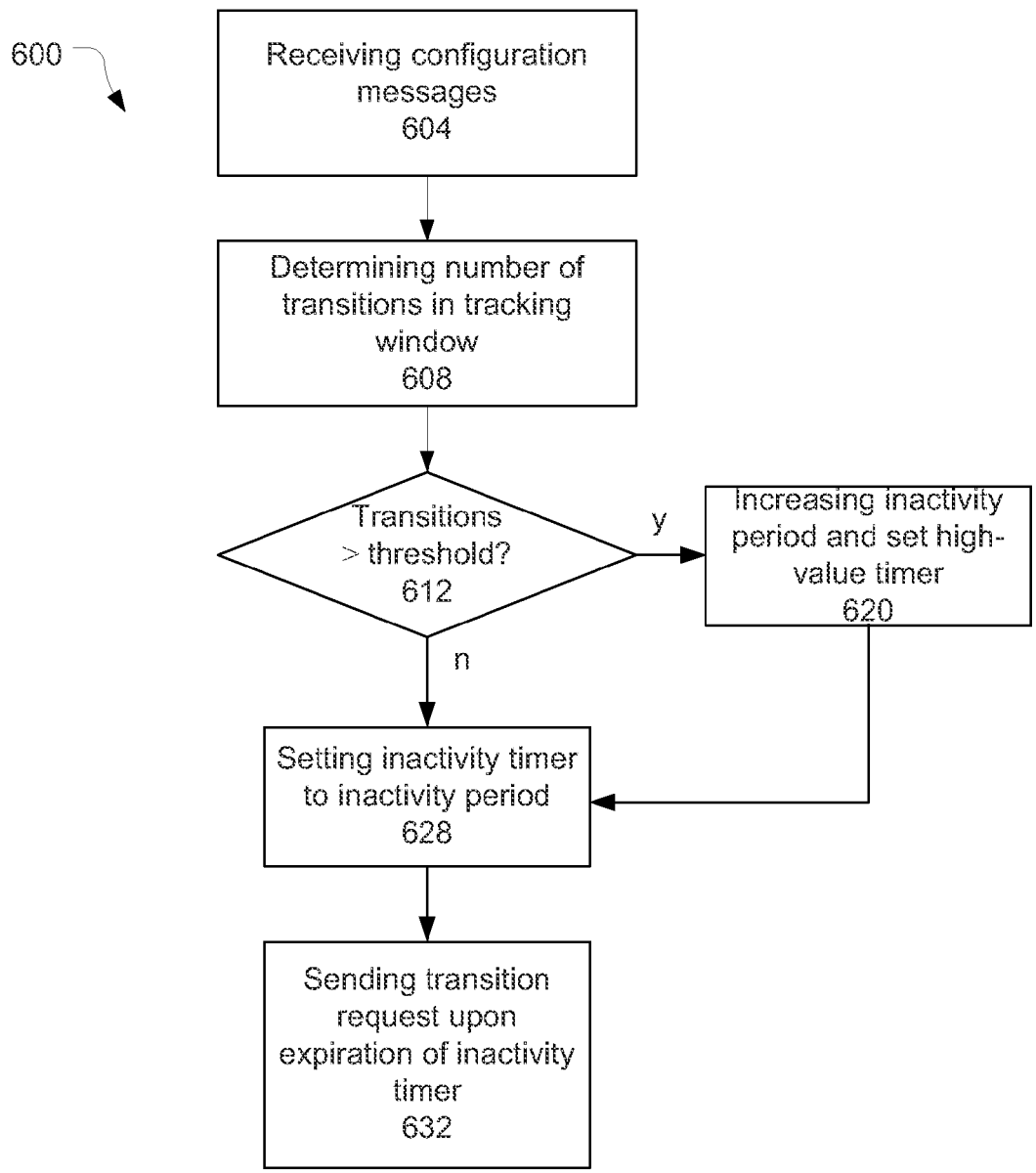
FIG. 6 illustrates a flow chart depicting an operation of communication-state circuitry in a user equipment in accordance with various embodiments.

FIG. 6 illustrates a flowchart depicting an operation 600 of the communication-state circuitry 132 in accordance with some embodiments.

The operation 600 may include receiving configuration messages at block 604 and determining number of transitions in tracking window at 608, similar to like-named blocks of operations 300 and 500. Further, the operation 600 may include comparing the number of tracked transitions to a threshold at block 612, similar to block 312 of the operation 300.

If it is determined, at block 612, that the number of tracked transitions is greater than the threshold, the operation 600 may advance to increasing an inactivity period and setting a high-value timer. The inactivity period may be increased by a delta value or it may be one or more increments within a table of inactivity period values. The value of the high-value timer, delta value and/or table of inactivity period values may be provided to the UE 108 in the configuration messages of block 604.

The high-value timer will limit the amount of time the inactivity period is set to a high value. When the high-value timer expires, the inactivity period may be reduced to its original value upon next expiration of the inactivity timer.

Following block 620 or a negative determination at block 612, the operation 600 may include setting an inactivity timer to the inactivity period at block 628.

In the event the inactivity timer expires without the communication circuitry 124 serving a packet, the operation 600 may include sending a transition request, similar to block 332 of operation 300.

Figure 7:
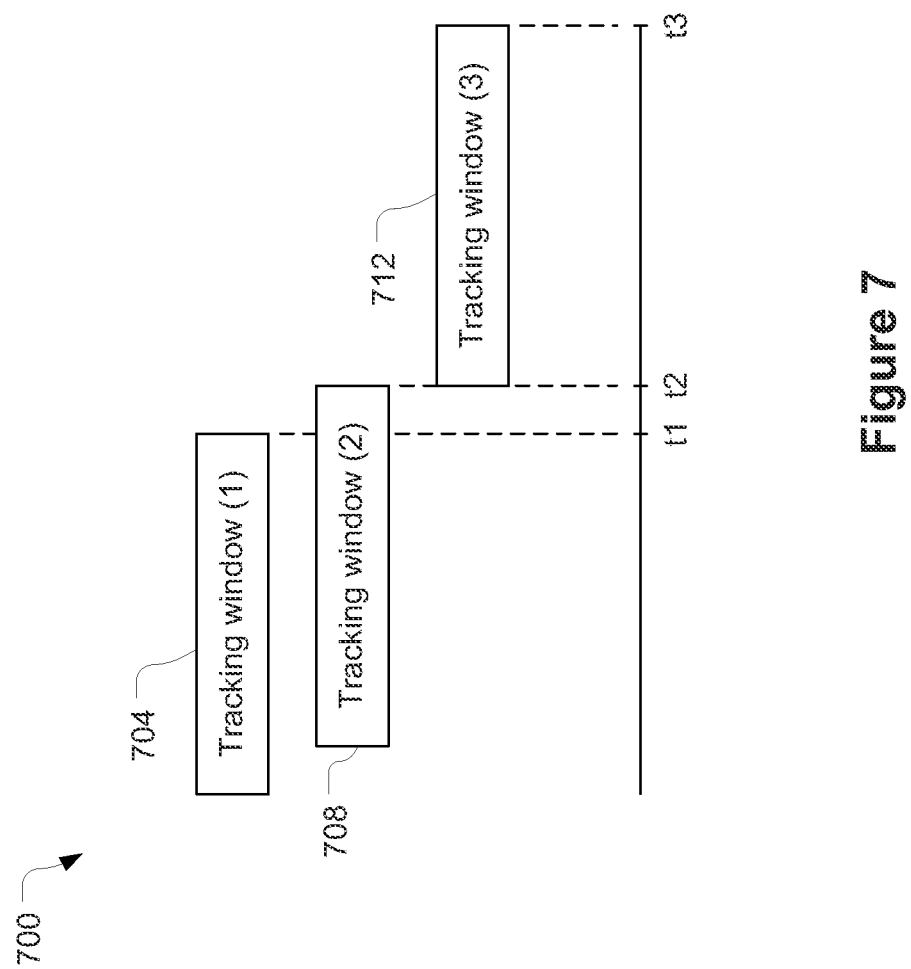
FIG. 7 illustrates a timing sequence of a threshold check in accordance with some embodiments.

In some embodiments, after each change of the inactivity period, e.g., in block 620 or upon expiration of the high-value timer, the communication-state circuitry 132 may implement a delay in the threshold checking (e.g., block 608 and block 612). FIG. 7 illustrates a timing sequence 700 of the threshold checking in the event of a change to an inactivity period in accordance with some embodiments.

A first threshold check may be performed at t1 in order to determine whether the number of state transitions in first tracking window 704 exceeds the threshold. Assuming that the transitions do not exceed the threshold, a second threshold check may be performed at t2, where t2−t1 is the normal period in which the threshold checks are performed (e.g., 2 seconds). If the second threshold check reveals the transitions exceed the threshold, the value of the inactivity period may be increased as described above with respect to operations 500 or 600. In this embodiment, the next threshold check may be delayed until t3, with the delay value equal to, e.g., the tracking window. This will provide the communication-state circuitry 132 with sufficient time to accumulate transition data based on the new inactivity period.

The operations of 300, 500, and 600 represent various ways in which the UE 108 (and the communication-state circuitry 132, in particular) may suppress transitions. In some embodiments, the UE 108 may choose which suppression method to use. For example, upon determining the tracked transitions are greater than a threshold, the UE 108 may also determine whether to disable the inactivity timer for a state-transition disable period (e.g., setting the inactivity timer to the state-transition disable period as is done in block 320) or increase the inactivity period (e.g., as is done in blocks 520 or 620).

Figure 8:
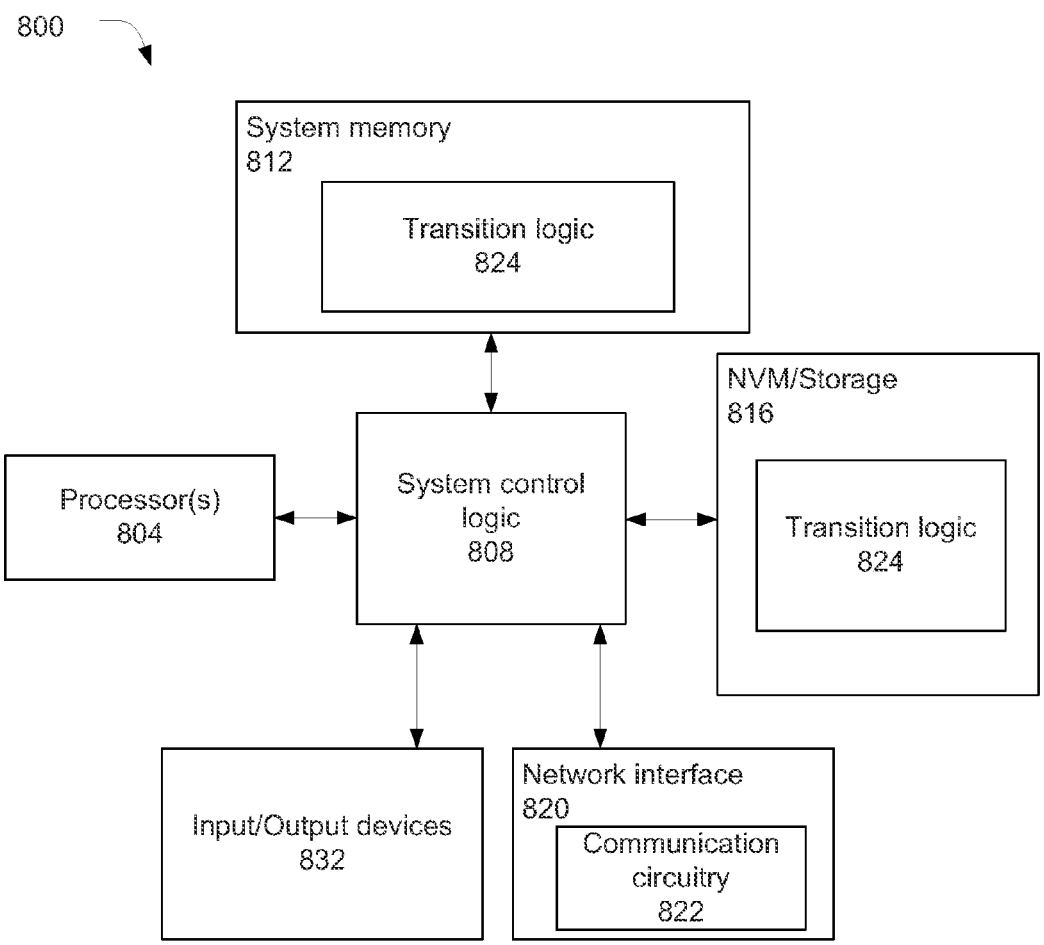
FIG. 8 schematically depicts an example system in accordance with various embodiments.

The circuitry described herein may be implemented into a system using any suitable hardware and/or software to configure as desired. FIG. 8 illustrates, for one embodiment, an example system 800 comprising one or more processor(s) 804, system control logic 808 coupled with at least one of the processor(s) 804, system memory 812 coupled with system control logic 808, non-volatile memory (NVM)/storage 816 coupled with system control logic 808, and a network interface 820 coupled with system control logic 808.

The processor(s) 804 may include one or more single-core or multi-core processors. The processor(s) 804 may include any combination of general-purpose processors and dedicated processors (e.g., graphics processors, application processors, baseband processors, etc.).

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. System memory 812 for one embodiment may include any suitable volatile memory, such as suitable dynamic random access memory (DRAM), for example.

NVM/storage 816 may include one or more tangible, non-transitory computer-readable media used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the network interface 820.

System memory 812 and NVM/storage 816 may respectively include, in particular, temporal and persistent copies of transition logic 824. The transition logic 824 may include instructions that when executed by at least one of the processor(s) 804 result in the system 800 implementing transition-control circuitry 120 or communication-state circuitry 132 to perform respective operations described herein. In some embodiments, the transition logic 824, or hardware, firmware, and/or software components thereof, may additionally/alternatively be located in the system control logic 808, the network interface 820, and/or the processor(s) 804.

System memory 812 and NVM/storage 816 may also include data that may be operated on, or otherwise used in conjunction with, the described components. For example, configuration parameters may be stored in system memory 812 and/or NVM/storage 816 and accessible by the transition logic 824 for implementing transition operations described herein.

Network interface 820 may have communication circuitry 822 to provide a radio interface for system 800 to communicate over one or more network(s) and/or with any other suitable device. The communication circuitry 822 may be similar to and substantially interchangeable with communication circuitry 112 and/or 124. The communication circuitry 822 may include a receiver and/or transmitter. In various embodiments, the communication circuitry 822 may be integrated with other components of system 800. For example, the communication circuitry 822 may include a processor of the processor(s) 804, memory of the system memory 812, and NVM/Storage of NVM/Storage 816. Network interface 820 may include any suitable hardware and/or firmware. Network interface 820 may include a plurality of antennas to provide a multiple input, multiple output radio interface. Network interface 820 for one embodiment may include, for example, a network adapter, a wireless network adapter, a telephone modem, and/or a wireless modem.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

The system 800 may further include input/output (I/O) devices 832. The I/O devices 832 may include user interfaces designed to enable user interaction with the system 800, peripheral component interfaces designed to enable peripheral component interaction with the system 800, and/or sensors designed to determine environmental conditions and/or location information related to the system 800.

In various embodiments, the user interfaces could include, but are not limited to, a display (e.g., a liquid crystal display, a touchscreen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 820 to communicate with components of a positioning network, e.g., a global positioning system (GPS) satellite.

In various embodiments, the system 800 may be a mobile computing device such as, but not limited to, a laptop computing device, a tablet computing device, a netbook, an ultrabook, a smartphone, etc. In various embodiments, system 800 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
   timer circuitry configured to set a first tracking window; and
   communication-state circuitry coupled with the timer circuitry and configured to:
   determine a first number of state transitions by communication circuitry that occur within the first tracking window;
   compare the first number of state transitions to a first predetermined threshold;
   suppress state transitions based on comparison of the first number of state transitions to the first predetermined threshold; and
   decrease an inactivity period based on a determination that a second number of state transitions that occur within a second tracking window is less than a second predetermined threshold,
   wherein the state transitions comprise transitions between a radio resource control (RRC) connected state and an RRC idle state or transitions between discontinuous reception (DRX) configurations.

2. The apparatus of claim 1, wherein the transitions between DRX configurations comprise updating one or more parameters of DRX operation.

3. The apparatus of claim 1, wherein the state circuitry is configured to suppress state transitions by being configured to:
   transmit a transition-suppress message to request an enhanced node base station (eNB) to refrain from issuing transition instructions.

4. The apparatus of claim 1, further comprising:
   an inactivity timer,
   wherein the communication-state circuitry is further configured to set the inactivity timer to a state-transition disable period value based on comparison of the first number of state transitions to the first predetermined threshold, and
   transmit, based on an expiration of the inactivity timer, a transition request message to request instructions to perform a state transition.

5. The apparatus of claim 1, wherein the communication-state circuitry is further configured to receive one or more configuration messages from an enhanced node base station (eNB), the one or more configuration messages to indicate values that correspond to the first tracking window and the first predetermined threshold.

6. The apparatus of claim 5, wherein the one or more configuration messages are received as part of radio resource control (RRC) configuration of the apparatus.

7. The apparatus of claim 1, further comprising:
   a counter,
   wherein the communication-state circuitry is further configured to increment the counter for each state transition that occurs in the first tracking window.

8. The apparatus of claim 1, wherein the communication-state circuitry is configured to suppress state transitions by being configured to:
   increase the inactivity period based on a determination that the first number of state transitions is greater than the first predetermined threshold.

9. The apparatus of claim 8, wherein the communication-state circuitry is configured to increase the inactivity period by a delta value or by one or more increments within a table of inactivity period values.

10. The apparatus of claim 9, wherein the communication-state circuitry is configured to receive the delta value or the table of inactivity period values in a radio resource control message from an enhanced node base station.

11. The apparatus of claim 8, wherein the communication-state circuitry is further configured to:
    set a timer of the timer circuitry based on increase in the inactivity period; and
    decrease the inactivity period based on expiration of the timer.

12. The apparatus of claim 1, wherein the apparatus comprises a user equipment that further includes a touchscreen user interface.

13. The apparatus of claim 1, wherein the communication-state circuitry is further configured to:
    determine whether to suppress state transitions by disabling an inactivity timer for a state-transition disable period or by increasing the inactivity period.

14. An article of manufacture comprising one or more non-transitory storage media having instructions that, when executed, cause a user equipment (UE) to:
    receive configuration parameters in one or more configuration messages from an enhanced node base station (eNB), the configuration parameters indicating a tracking timer value and a counter threshold value;
    compare a first number of state transitions performed by communication circuitry within a first tracking window, which corresponds to tracking timer value, with the counter threshold value;
    suppress a state transition based on the comparison; and
    decrease an inactivity period based on a determination that a second number of state transitions that occur within a second tracking window is less than a second predetermined threshold,
    wherein the state transitions are radio resource control (RRC) state transitions that include transitions from RRC_connect to RRC_idle or transitions from RRC_idle to RRC_connect or transitions between DRX configurations.

15. The article of manufacture of claim 14, wherein the transitions between DRX configurations include updating one or more parameters of DRX operation.

16. The article of manufacture of claim 14, wherein the state transitions are autonomous state transitions that are performed by the UE without instruction by the eNB.

17. The article of manufacture of claim 14, wherein the instructions, when executed, cause the UE to:
    suppress the state transition by increasing the inactivity period by a delta value or by one or more increments within a table of inactivity period values.

18. The article of manufacture of claim 17, wherein the instructions, when executed, further cause the UE to:
    set a timer of the timer circuitry based on increase in the inactivity period; and
    decrease the inactivity period based on expiration of the timer.

* * * * *